(12) United States Patent
Booth et al.

(10) Patent No.: US 11,830,148 B2
(45) Date of Patent: *Nov. 28, 2023

(54) RECONSTRUCTION OF ESSENTIAL VISUAL CUES IN MIXED REALITY APPLICATIONS

(71) Applicant: META PLATFORMS TECHNOLOGIES, LLC, Menlo Park, CA (US)

(72) Inventors: James Allan Booth, Zurich (CH); Gaurav Chaurasia, Zurich (CH); Alexandru-Eugen Ichim, Ruschlikon (CH); Alex Locher, Oberrohrdorf (CH); Gioacchino Noris, Zurich (CH); Alexander Sorkine Hornung, Zurich (CH); Manuel Werlberger, Zurich (CH)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,045

(22) Filed: Jul. 30, 2020

(65) Prior Publication Data

US 2021/0012571 A1 Jan. 14, 2021

Related U.S. Application Data

(63) Continuation of application No. 16/133,601, filed on Sep. 17, 2018, now Pat. No. 10,733,800.

(51) Int. Cl.
*G06T 19/00* (2011.01)
*G06T 15/04* (2011.01)
*G06T 17/20* (2006.01)

(52) U.S. Cl.
CPC ............ *G06T 19/006* (2013.01); *G06T 15/04* (2013.01); *G06T 17/20* (2013.01)

(58) Field of Classification Search
CPC ....... G06T 19/006; G06T 15/04; G06T 17/20; G06T 7/593; G06T 17/00
See application file for complete search history.

(56) References Cited

U.S. PATENT DOCUMENTS 6,842,175 B1 * 1/2005 Schmalstieg ........... G06F 3/011
345/427
9,047,706 B1 * 6/2015 Ogale ..................... G06T 15/20
(Continued)

OTHER PUBLICATIONS

Popović, Mila, et al. "Grasping unknown objects using an early cognitive vision system for general scene understanding." 2011 IEEE/RSJ International Conference on Intelligent Robots and Systems. IEEE, 2011. (Year: 2011).*

*Primary Examiner* — Maurice L. McDowell, Jr.
(74) *Attorney, Agent, or Firm* — Potomac Law Group, PLLC

(57) ABSTRACT

A mixed reality (MR) simulation system includes a console and a head mounted device (HMD). The MR system captures stereoscopic images from a real-world environment using outward-facing stereoscopic cameras mounted to the HMD. The MR system preprocesses the stereoscopic images to maximize contrast and then extracts a set of features from those images, including edges or corners, among others. For each feature, the MR system generates one or more two-dimensional (2D) polylines. Then, the MR system triangulates between 2D polylines found in right side images and corresponding 2D polylines found in left side images to generate a set of 3D polylines. The MR system interpolates between 3D vertices included in the 3D polylines or extrapolates additional 3D vertices, thereby generating a geometric reconstruction of the real-world environment. The MR system may map textures derived from the real-world environment onto the geometric representation faster than the geometric reconstruction is updated.

21 Claims, 9 Drawing Sheets

(56) References Cited

U.S. PATENT DOCUMENTS

| | | | |
|---|---|---|---|
| 10,733,800 B2* | 8/2020 | Booth | G06T 17/20 |
| 2008/0089577 A1* | 4/2008 | Wang | G06V 10/10 |
| | | | 382/154 |
| 2009/0251465 A1* | 10/2009 | Hassenpflug | G06T 7/174 |
| | | | 345/646 |
| 2009/0279784 A1* | 11/2009 | Arcas | G06T 15/205 |
| | | | 382/190 |
| 2010/0315412 A1 | 12/2010 | Sinha et al. | |
| 2012/0001901 A1* | 1/2012 | Park | G06T 7/593 |
| | | | 345/419 |
| 2012/0069018 A1* | 3/2012 | Yamaya | G06T 7/593 |
| | | | 345/420 |
| 2012/0194516 A1* | 8/2012 | Newcombe | G06T 17/00 |
| | | | 345/420 |
| 2013/0215230 A1 | 8/2013 | Miesnieks et al. | |
| 2014/0071251 A1 | 3/2014 | Nakamura et al. | |
| 2015/0015576 A1* | 1/2015 | Algreatly | G06T 17/00 |
| | | | 345/420 |
| 2015/0029214 A1 | 1/2015 | Kumagai | |
| 2015/0312561 A1* | 10/2015 | Hoof | H04N 21/41407 |
| | | | 348/46 |
| 2015/0348511 A1 | 12/2015 | Oriol et al. | |
| 2016/0027215 A1* | 1/2016 | Burns | G06F 3/011 |
| | | | 345/419 |
| 2018/0114353 A1* | 4/2018 | Champion | H04N 13/344 |
| 2018/0144458 A1* | 5/2018 | Xu | G06T 7/70 |
| 2018/0144547 A1* | 5/2018 | Shakib | G06T 15/503 |
| 2018/0173404 A1 | 6/2018 | Smith | |
| 2018/0174367 A1 | 6/2018 | Marom et al. | |
| 2018/0247446 A1* | 8/2018 | Litvin | G06T 19/20 |
| 2019/0197768 A1 | 6/2019 | Taylor et al. | |
| 2020/0027194 A1* | 1/2020 | Nourai | G06F 3/011 |
| 2020/0368616 A1* | 11/2020 | Delamont | A63F 13/25 |
| 2021/0134000 A1* | 5/2021 | Malisiewicz | G06K 9/66 |
| 2021/0233303 A1* | 7/2021 | Takahashi | H04N 19/597 |

* cited by examiner

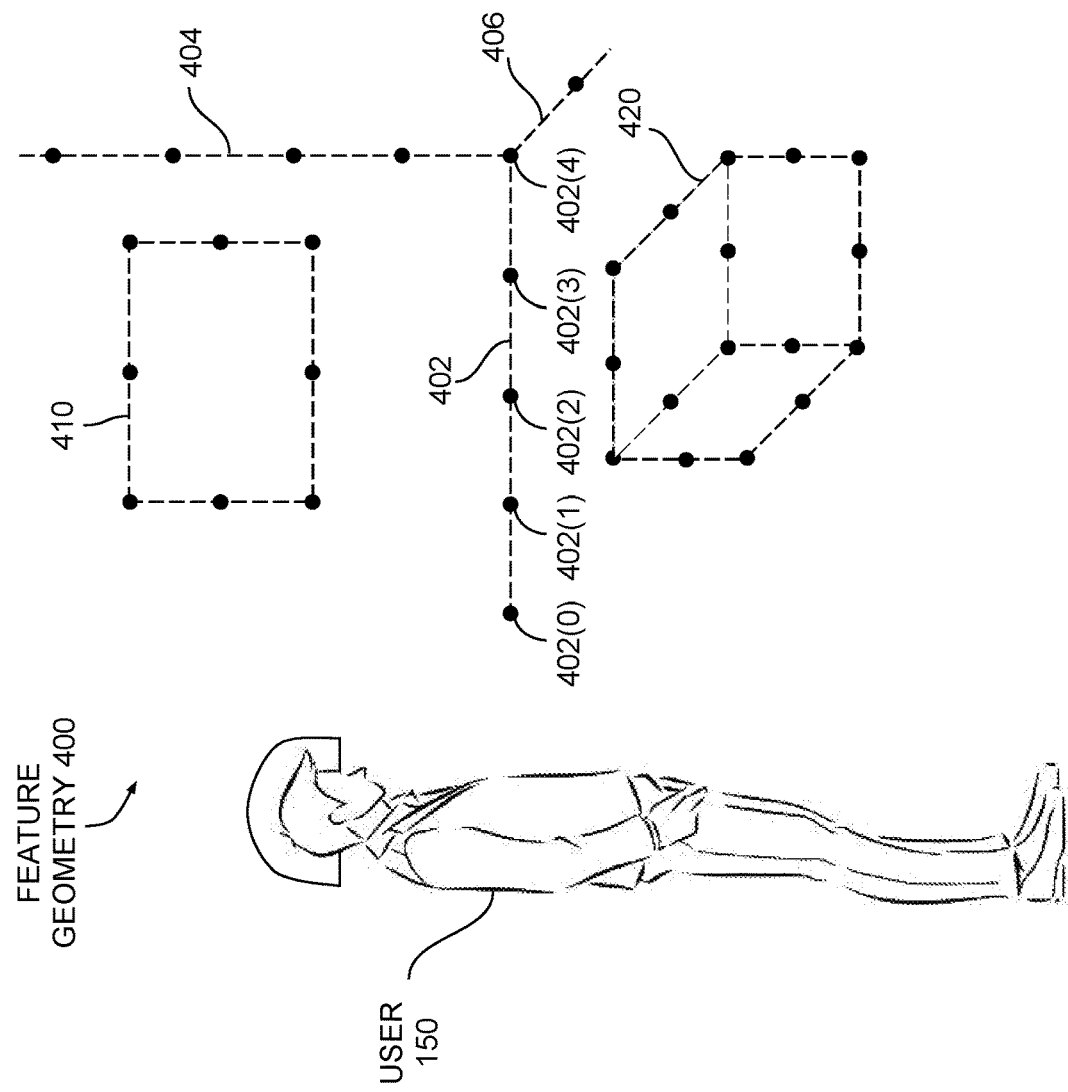
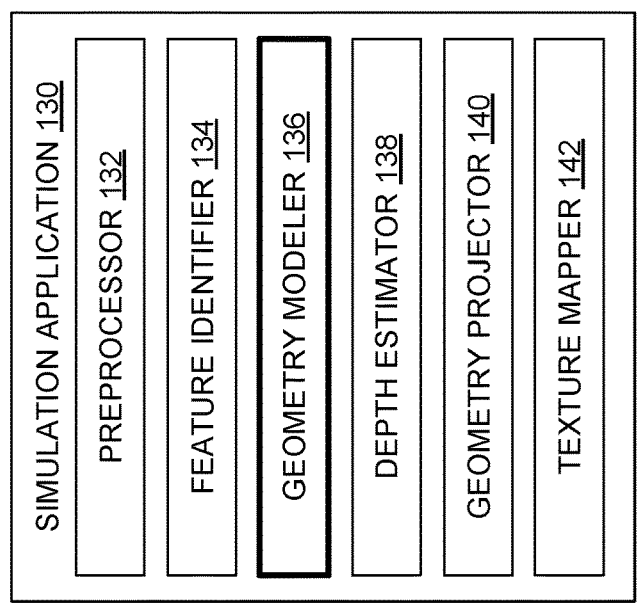
FIG. 4

TEXTURED SCENE 700

USER 150

RECONSTRUCTION OF ESSENTIAL VISUAL CUES IN MIXED REALITY APPLICATIONS

CROSS-REFERENCE TO RELATED APPLICATIONS

This application is a continuation of the co-pending U.S. patent application titled, "RECONSTRUCTION OF ESSENTIAL VISUAL CUES IN MIXED REALITY APPLICATIONS," filed on Sep. 17, 2018 and having Ser. No. 16/133,601. The subject matter of this related application is hereby incorporated herein by reference.

BACKGROUND

Field of the Various Embodiments

Various embodiments relate generally to virtual reality and augmented reality, and, more specifically, to reconstruction of essential visual cues in mixed reality applications.

Description of the Related Art

Artificial reality systems simulate virtual environments or add virtual elements to real environments in order to provide virtual reality (VR), augmented reality (AR), and/or mixed reality (MR) content to a user. The artificial reality system includes a console and a headset. The console generates and renders graphical elements, while the headset outputs these graphical elements to a user. A headset includes a stereoscopic display that outputs slightly different images to each eye of the user, thereby causing the user to perceive a 3D spatial environment. Headsets may also include outward facing cameras configured to capture stereoscopic imagery in order to generate a mixed reality simulation.

The term "mixed reality" generally refers to any type of simulation where simulated graphical elements are displayed to a user in conjunction with real-world elements and/or simulated versions of real-world elements. For example, a console could capture stereoscopic images representing the environment surrounding the user via the outward facing cameras on the headset. The console would then generate three-dimensional (3D) graphical elements associated with a video game or other type of computer simulation. The console would then incorporate the generated 3D graphical elements into the stereoscopic images and output the result to the user via the headset.

Outward-facing cameras mounted on headsets are usually separated from one another with a camera disparity that differs from the interpupillary distance of most users. Consequently, stereoscopic imagery that is captured and subsequently displayed to a user may appear spatially distorted, which can lead to a poor user experience. Further, this spatial distortion can diminish the user's spatial awareness of the real-world environment, which can be dangerous in some cases.

Artificial reality systems typically lack the processing power to generate a mixed reality simulation that addresses this spatial distortion while also maintaining a high quality user experience. Consequently, these systems output mixed reality simulations with very low frame rates, and, therefore, a noticeable latency. This latency is distracting and leads to a poor user experience. Large latencies can also be dangerous because users may unknowingly encounter (and potentially collide with) real-world objects before the simulation can be updated to represent those objects. Furthermore, without addressing the spatial distortion mentioned above, the mixed reality simulations generated by conventional artificial reality systems can cause the user to experience motion sickness and disorientation, resulting in a poor user experience.

SUMMARY

Various embodiments include a computer-implemented method, including identifying a set of features associated with one or more objects in a real-world scene, generating two-dimensional (2D) geometry based on the set of features, generating three-dimensional (3D) geometry based on the 2D geometry, the 3D geometry comprising a geometric reconstruction of the real-world scene that only partially represents the one or more objects, and rendering, based on the 3D geometry, a first graphical representation of the real-world scene for display.

At least one advantage of the disclosed techniques is that the MR system can produce an immersive and spatially realistic mixed reality experience with little or no latency. Because the MR system generates the geometric reconstruction based only on essential geometric features of the real-world environment, the MR system can update that reconstruction much faster compared to conventional systems that must generate and update highly complex geometric reconstructions. In addition, since the MR system maps textures derived from the real-world environment onto the geometric reconstruction in real time, the MR system can output mixed reality simulations with negligible latency. Accordingly, the techniques disclosed herein represent a significant technological advancement compared to conventional approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4 illustrates how the simulation application of FIG. 1 generates feature geometry based on a set of identified features, according to various embodiments;

DETAILED DESCRIPTION

Figure 1:
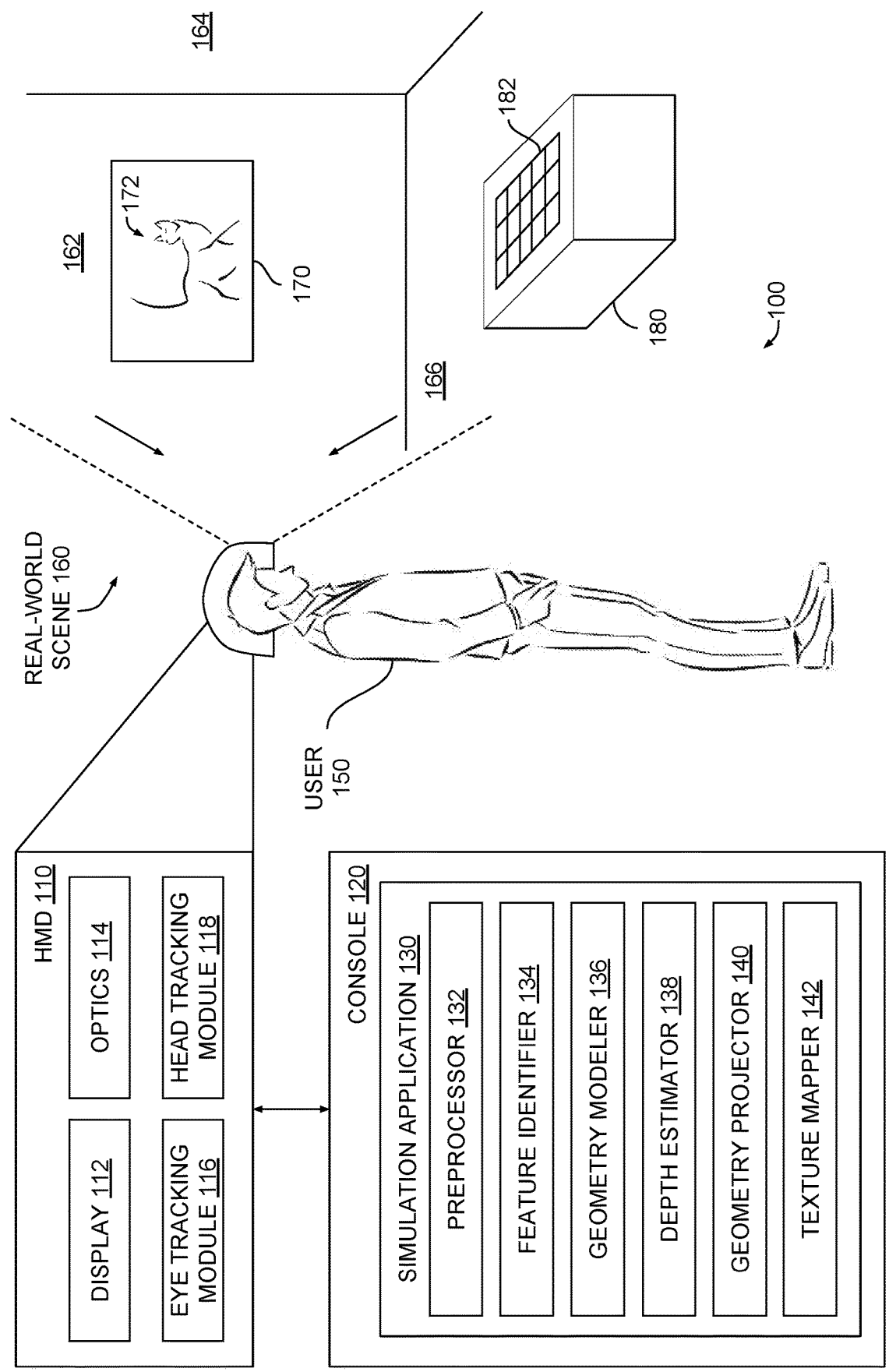
FIG. 1 illustrates a system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

Some mixed reality systems capture stereoscopic images from the real-world and then render a geometrical reconstruction of the real-world to users. Because this approach requires highly complex geometry to be updated in real time, such simulations cannot operate with a sufficiently high frame rate to approximate reality. Consequently, these types of simulations suffer from noticeable latencies, which can diminish the user experience and potentially expose the user to safety risks. These issues are especially problematic in mobile platforms that have limited compute power and limited memory.

To address these issues, various embodiments include a mixed reality (MR) system configured to update a geometric reconstruction of a real-world environment with a given latency and render portions of the geometric reconstruction for display to the user with a lower latency. The MR system may additionally map textures derived from the real-world environment onto the geometric representation with a lower latency.

In operation, the MR system captures stereoscopic images from the real-world environment using a set of outward-facing stereoscopic cameras mounted to a head mounted device (HMD). The MR system preprocesses the stereoscopic images to maximize contrast and then extracts a set of features from those images, including lines, edges, or corners, among others. In other embodiments, the MR system extracts the set of features without performing contrast enhancement operations. For each feature, the MR system generates one or more two-dimensional (2D) polylines. The MR system triangulates between 2D polylines found in right side images of the stereoscopic images and corresponding 2D polylines found in left side images of the stereoscopic images to generate a set of 3D polylines. The MR system interpolates between 3D vertices included in the 3D polylines or extrapolates additional 3D vertices, thereby generating an approximate geometric reconstruction of the real-world environment.

The MR system may update the geometric reconstruction in real-time or slower than real time, depending on hardware capabilities. The MR system may also generate and render 3D graphics for display to the user in real time and with a high frame rate. When rendering the graphics, the MR system is configured to remap textures derived from the raw stereoscopic images of the real-world environment back onto the geometric reconstruction in order to enhance the realism of those 3D graphics.

At least one advantage of the techniques described herein is that the MR system can produce an immersive and spatially realistic mixed reality experience with little or no latency. Because the MR system generates the geometric reconstruction based on essential geometric features of the real-world environment, the MR system can update that reconstruction much faster compared to conventional systems that generate and update highly complex geometric reconstructions. In addition, since the MR system maps textures derived from the real-world environment onto the geometric reconstruction in real time, the MR system can output realistic mixed reality simulations with negligible latency. Accordingly, the techniques disclosed herein represent a significant technological advancement compared to conventional approaches.

System Overview

FIG. 1 illustrates a system configured to implement one or more aspects of the various embodiments. As shown, MR system 100 includes a head mounted device (HMD) 110 and a console 120. HMD 110 is a wearable device configured to be worn by a user 150. HMD 110 is configured to immerse user 150 into a mixed reality simulation generated by console 120 or HMD 110. That simulation is based, at least in part, on a real-world scene 160 associated with the environment where user 150 resides. In one embodiment, HMD 110 may operate as a pass-through device to relay images of the environment to user 150. Those images may be either unmodified or augmented by HMD 110.

HMD 110 includes a display 112, optics 114, eye tracking module 116, and head tracking module 118. Display 112 is a stereoscopic output device configured to output stereoscopic images to user 150. Those images may represent real-world scene 160 as viewed from slightly different perspectives, thereby causing user 150 to perceive a three-dimensional (3D) spatial environment. Optics 114 includes an assembly of optical devices, including one or more outward facing cameras. In one embodiment, optics 114 performs various optical adjustments with light that is captured and/or emitted via HMD 110.

Eye tracking module 116 is configured to track the eye gaze direction of user 150. In one embodiment, eye tracking module 116 measures various attributes of user 150, including the interpupillary distance of user 150, and then configures optics 114 to perform various optical adjustments based on those measurements. In another embodiment, eye tracking module 116 may be omitted. Head tracking module 118 is configured to track the head position and/or orientation of user 150. In one embodiment, one or more perspectives associated with simulations output via HMD 110 are modified based on head tracking data gathered via head tracking module 118.

Figure 9:
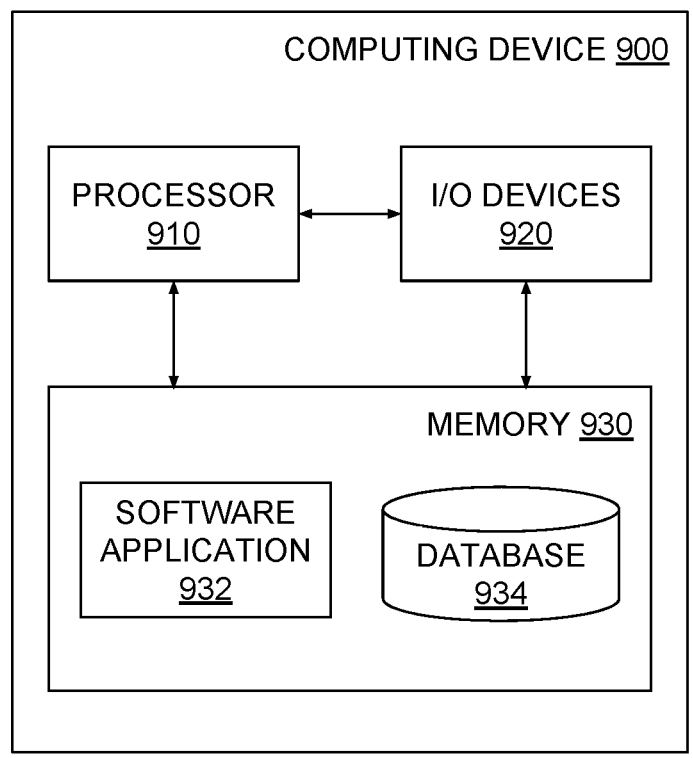
FIG. 9 is a block diagram of a generic computing device, according to various embodiments.

Console 120 is a computing device configured to execute a simulation application 130 in order to generate the mixed reality simulation output to user 150 via HMD 110. In one embodiment, HMD 110 executes simulation application 130 to generate the mixed reality simulation. An exemplary computing device that may be configured to implement either of HMD 110 and console 120 is illustrated in FIG. 9. Simulation application 130 includes a preprocessor 132, a feature identifier 134, a geometry modeler 136, a depth estimator 138, a geometry projector 140, and a texture mapper 142. Each of these blocks represents a different stage in a processing pipeline configured to generate the mixed reality simulation of real-world scene 160 mentioned above. As is shown, real-world scene 160 includes walls 162 and 164 and floor 166. A frame 170 is mounted to wall 162 and holds a painting 172. A box 180 rests on floor 166, and a placemat 182 rests on box 180.

In operation, preprocessor 132 receives left side and right side images of real-world scene 160 captured stereoscopically via optics 114. In one mode of operation, preprocessor 132 preprocesses those images to increase contrast, as described in greater detail below in conjunction with FIG. 2.

Feature identifier 134 analyzes the preprocessed images to identify one or more features, as described in greater detail below in conjunction with FIG. 3. Geometry modeler 136 generates, based on the identified features, feature geometry representing real-world scene 160, as described in greater detail below in conjunction with FIG. 4. Depth estimator 138 interpolates and/or extrapolates depth information to enhance the feature geometry and generate a geometric reconstruction, as described in greater detail below in conjunction with FIG. 5. Geometry projector 140 renders stereoscopic images based on the geometric reconstruction, as described in greater detail below in conjunction with FIG. 6. Additionally, texture mapper 142 may extract textures from the original raw images and map these textures onto the geometric reconstruction to provide more detailed renderings of the geometric reconstruction, as described in greater detail below in conjunction with FIG. 7.

The approach described herein confers several technological advantages. In particular, simulation application 130 generates a simplified geometrical reconstruction that may be rendered in real time with sufficiently powerful hardware. However, if such hardware is not available and the reconstruction cannot be updated in real time, then simulation application 130 can nonetheless project that geometry for stereoscopic rendering in real time and with minimal latency. In either case, simulation application 130 is typically capable of mapping textures onto the geometrical reconstruction in real time, thereby enhancing the appearance and realism of the mixed reality simulation. These techniques represent a significant advancement over conventional mixed reality simulations in general, and 3D passthrough for mixed reality applications specifically, which can appear either physically distorted or slow due to excessive latency.

Exemplary Generation of a Mixed Reality Simulation

FIGS. 2-7 illustrate how simulation application 130 implements the various processing stages discussed briefly above. Persons skilled in the art will appreciate that these Figures and corresponding descriptions are provided for exemplary purposes and not meant to be limiting in scope.

Figure 2:
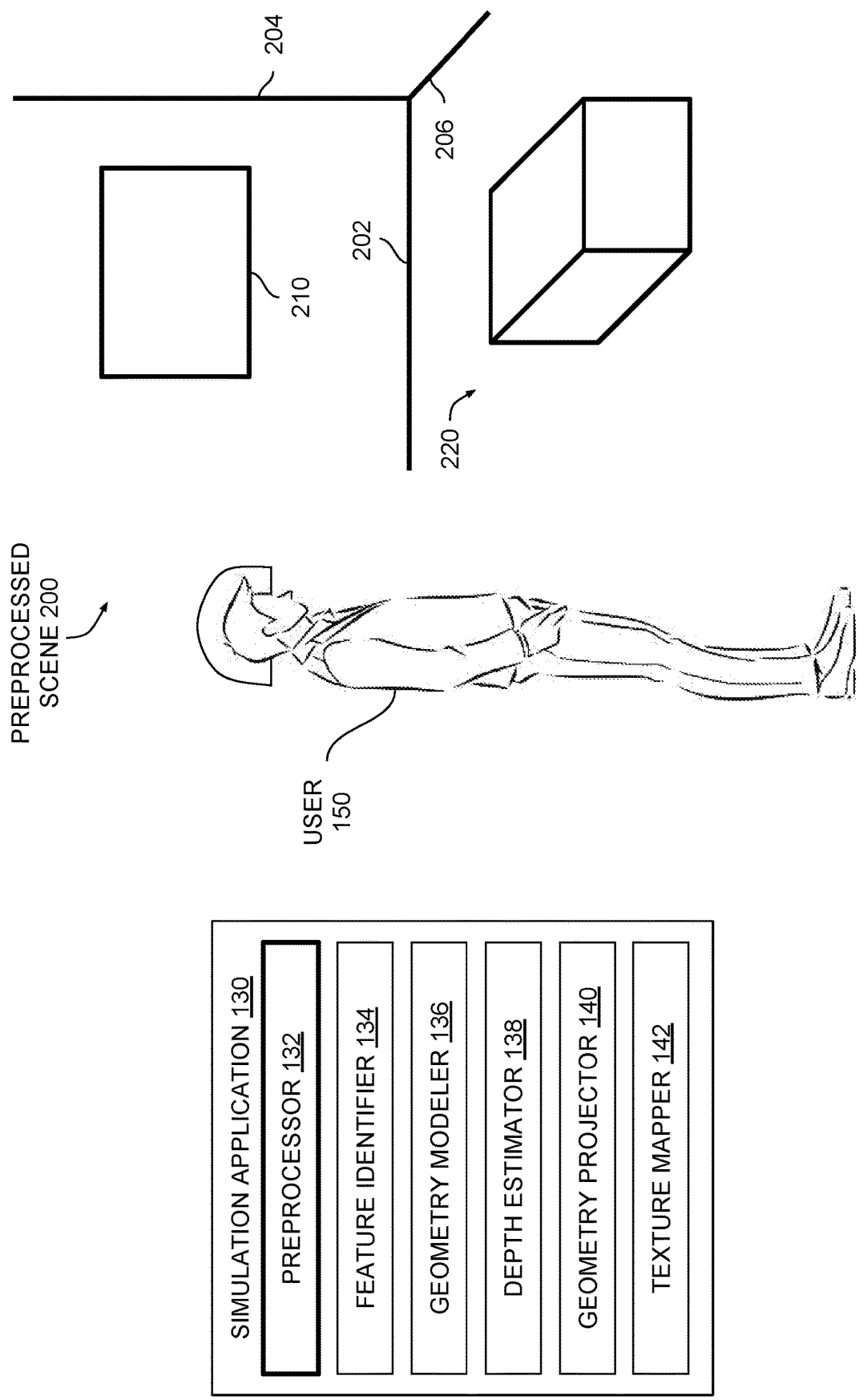
FIG. 2 illustrates how the simulation application of FIG. 1 preprocesses raw images associated with a real-world scene, according to various embodiments.

FIG. 2 illustrates how the simulation application of FIG. 1 preprocesses raw images associated with a real-world scene, according to various embodiments. As shown, preprocessor 132 within simulation application 130 generates preprocessed scene 200 with an elevated overall contrast level to highlight sets of edges 202, 204, 206, 210, and 220. Preprocessor 132 analyzes raw stereoscopic images depicting real-world scene 160 and then boosts contrast in some or all regions of those images. In one embodiment, preprocessor 132 may adjust image contrast differently across different image regions. Preprocessor 132 can increase image contrast in this manner to facilitate subsequent detection of features within preprocessed images, although in some embodiments feature detection may be performed without first adjusting image contrast. The detection of features is described in greater detail below in conjunction with FIG. 3.

Figure 3:
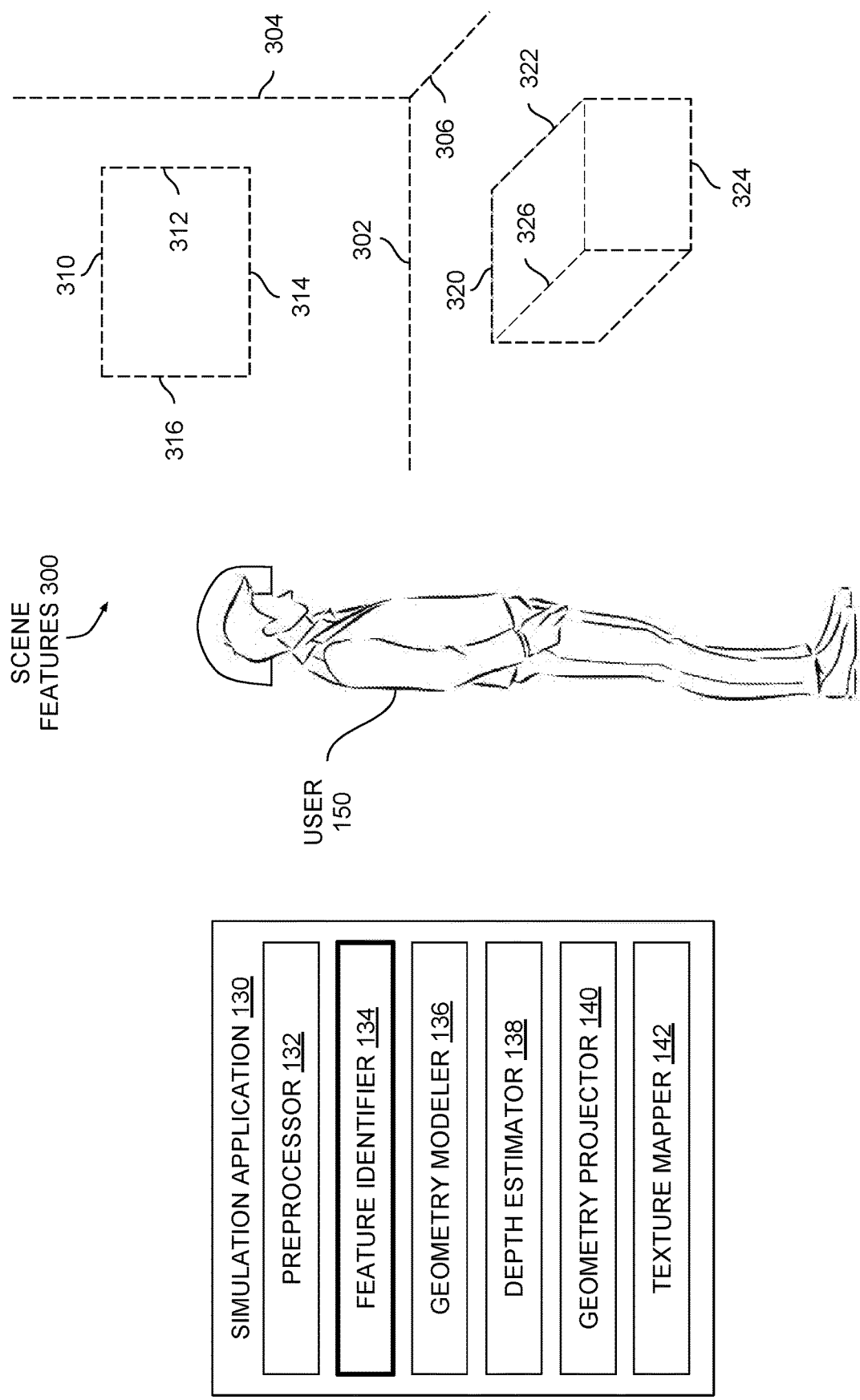
FIG. 3 illustrates how the simulation application of FIG. 1 identifies features within preprocessed images, according to various embodiments.

FIG. 3 illustrates how the simulation application of FIG. 1 identifies features within preprocessed images, according to various embodiments. As shown, feature identifier 134 within simulation application 130 detects features of the real-world scene 160 including, for example, specific scene features 300, including edges 302, 304, and 306 of the room where user 150 resides, edges 310, 312, 314, and 316 of frame 170, and edges 320, 322, 324, and 326 (among others) of box 180.

When identifying features in this manner, feature identifier 134 implements computer vision techniques to analyze left side and right side images. Feature identifier 134 may identify the presence of lines, edges, corners, surfaces, and any other technically feasible feature that can be identified based on a set of pixels. In one embodiment, the essential features identified via feature identifier 134 may include any type of visual cue or visual reference that user 150 may recognize for the purposes of localization and/or orientation. Such features may be referred to as "essential" in this disclosure because human spatial perception relies, at least to some degree, on recognizing these features for precise navigation of a physical space. As described in greater detail below, MR system 100 reproduces these essential features to assist user 150 with safe navigation of real-world environments during immersion in the mixed-reality simulation. In identifying features, feature identifier 134 may implement a Canny edge detection algorithm to identify specific groups of pixels that belong to specific edges or any other computer vision technique for identifying recognizable features. Feature identifier 134 may tag pixels or groups of pixels within preprocessed images with specific classifications and then output tagged, preprocessed images to geometry modeler 136, as described in greater detail below in conjunction with FIG. 4.

FIG. 4 illustrates how the simulation application of FIG. 1 generates feature geometry based on a set of identified features, according to various embodiments. As shown, geometry modeler 136 within simulation application 130 generates feature geometry 400 to represent specific geometric attributes of real-world scene 160. Feature geometry 400 includes polylines 402, 404, and 406 representing edges of the room where user 150 resides, polylines 410 representing frame 170, and polylines 420 representing box 180. Each polyline includes a set of vertices. For example, polyline 402 includes vertices 402(0) through 402(4). In various embodiments, geometry modeler 136 may generate any technically feasible geometric primitive instead of 2D polylines. For example, geometry modeler 136 could generate 2D feature points or 2D patches, among other types of geometric primitives. Persons skilled in the art will understand how the techniques described herein can be performed with any type of geometric primitive instead of 2D polylines.

To generate feature geometry 400, geometry modeler 136 generates a different 2D polyline to represent each feature identified by feature identifier 143. For example, geometry modeler 136 could overlay a line segment across a given edge detected by feature identifier 143 and generate a set of vertices defining that line segment. Geometry modeler 136 performs this operation for both left side and right side images. Then, geometry modeler 136 matches some or all 2D polylines included in the left side image to corresponding 2D polylines included in the associated right side image.

Geometry modeler 136 may implement any technically feasible approach to matching 2D polylines, vertices of those polylines, and individual pixels associated with those polylines between different images. In one embodiment, geometry modeler 136 implements an image-space patch matching approach to correlate polyline vertices between left and right side images. Geometry modeler 136 then triangulates between matched 2D polylines in order to infer depth information for each vertex of those polylines, thereby generating 3D polylines. Each 3D polyline includes a set of 3D vertices. Geometry modeler 136 may also discard specific 2D polylines that are too far away from one another to permit the accurate computation of depth information. Geometry modeler 136 may implement any technically feasible approach for triangulating elements of stereoscopic image pairs to infer the depth information described herein. The generated 3D polylines form the basis for a geometric reconstruction of real-world scene 160 and are processed further via depth estimator 138, as described in greater detail below in conjunction with FIG. 5.

Figure 5:
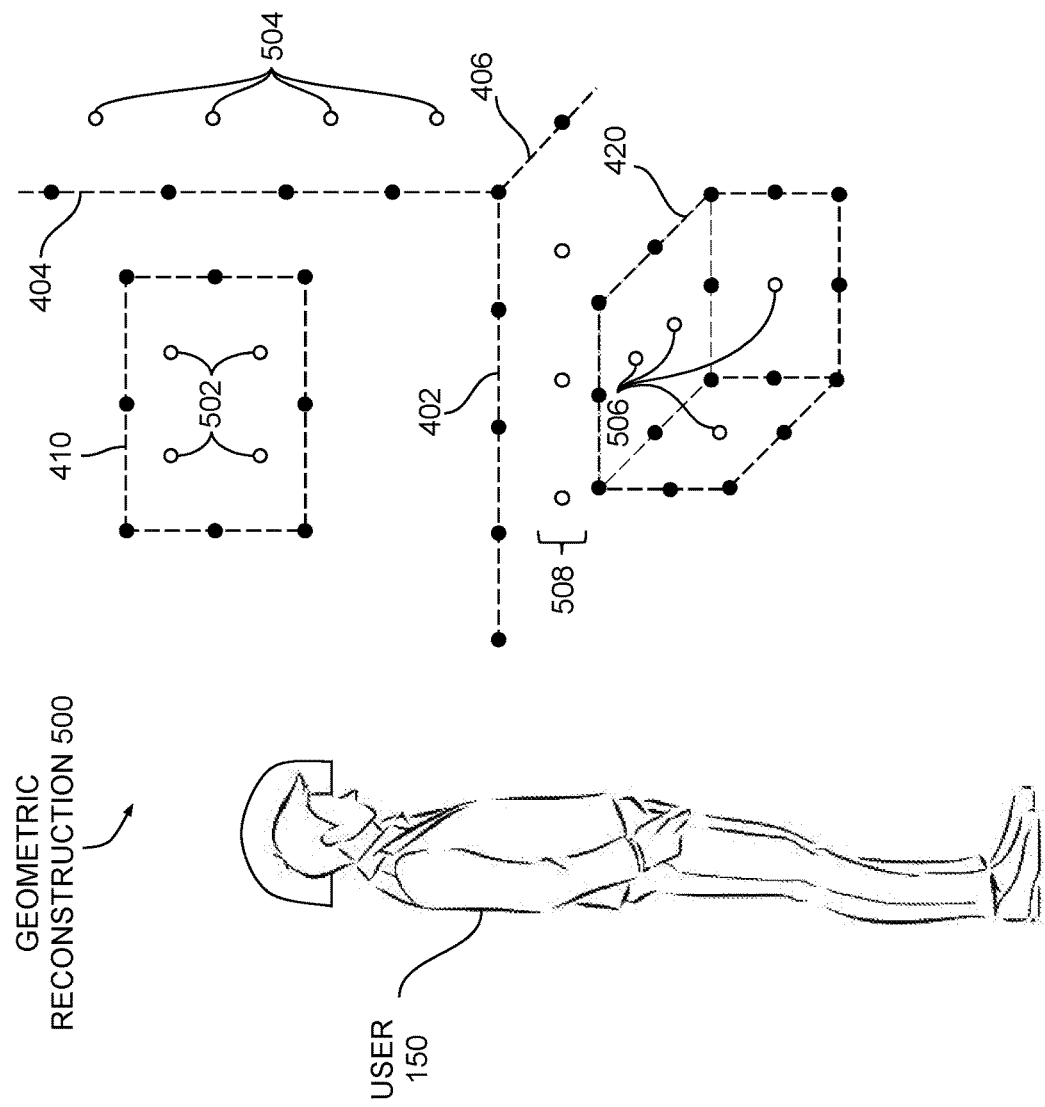
FIG. 5 illustrates how the simulation application of FIG. 1 generates a geometric reconstruction based on feature geometry, according to various embodiments.

FIG. 5 illustrates how the simulation application of FIG. 1 generates a geometric reconstruction based on feature geometry, according to various embodiments. As shown, depth estimator 138 within simulation application 130 generates geometric reconstruction 500 based on feature geometry 400 discussed above in conjunction with FIG. 4. Geometric reconstruction 500 includes 3D vertices 502 interpolated between polylines 410, 3D vertices 504 interpolated between polylines 404 and 406, 3D vertices 506 interpolated between polylines 420, and 3D vertices 508 interpolated between 402 and 406. Geometric reconstruction 500 includes additional depth information that is interpolated and/or extrapolated based on the 3D vertices of the 3D polylines generated via geometry modeler 136. In one embodiment, depth estimator 138 also filters outliers prior to interpolation/extrapolation in order to avoid generating 3D vertices based on polylines that are exceedingly far away from one another.

Because geometric reconstruction 500 is generated based on essential features of real-world scene 160, such as lines, edges, and so forth, geometric reconstruction 500 may only partially represent objects within that scene. Accordingly, geometric reconstruction 500 may be considered a coarse approximation of real-world scene 160. Nonetheless, geometric reconstruction 500 may appear highly accurate from a geometrical standpoint due to the computational emphasis place on reconstructing essential cues and other features, including object contours and silhouettes.

In one embodiment, depth estimator 138 may implement a Delaunay triangulation based on the 3D polylines generated via geometry modeler 136 in order to generate a triangulated mesh for approximating additional 3D vertices. This mesh traverses between 3D polylines and forms a surface that approximates the geometry of real-world scene 160 at a more global level than previous interpolation/extrapolation operations. Estimating depth for 3D vertices in this manner may be computationally efficient because the actual geometry between any two edges or corners in a typical real-world structure is often planar. For example, floor 166 is a flat plane, and so numerous 3D vertices across that plane can be approximated with high precision based on polylines 402 and 406 bordering that plane. An advantage of this approach is that visual artifacts commonly associated with the faithful reconstruction of certain real-world features, such as flat surfaces, for example, can be reduced because the geometry of those features can be estimated instead of reconstructed. Stylizing those features may further reduce artifacts, as well. Once depth estimator 138 generates the additional 3D vertices in the manner discussed above, geometry projector 140 may render 3D graphics that can be output to user 150, as described in greater detail below in conjunction with FIG. 6.

Figure 6:
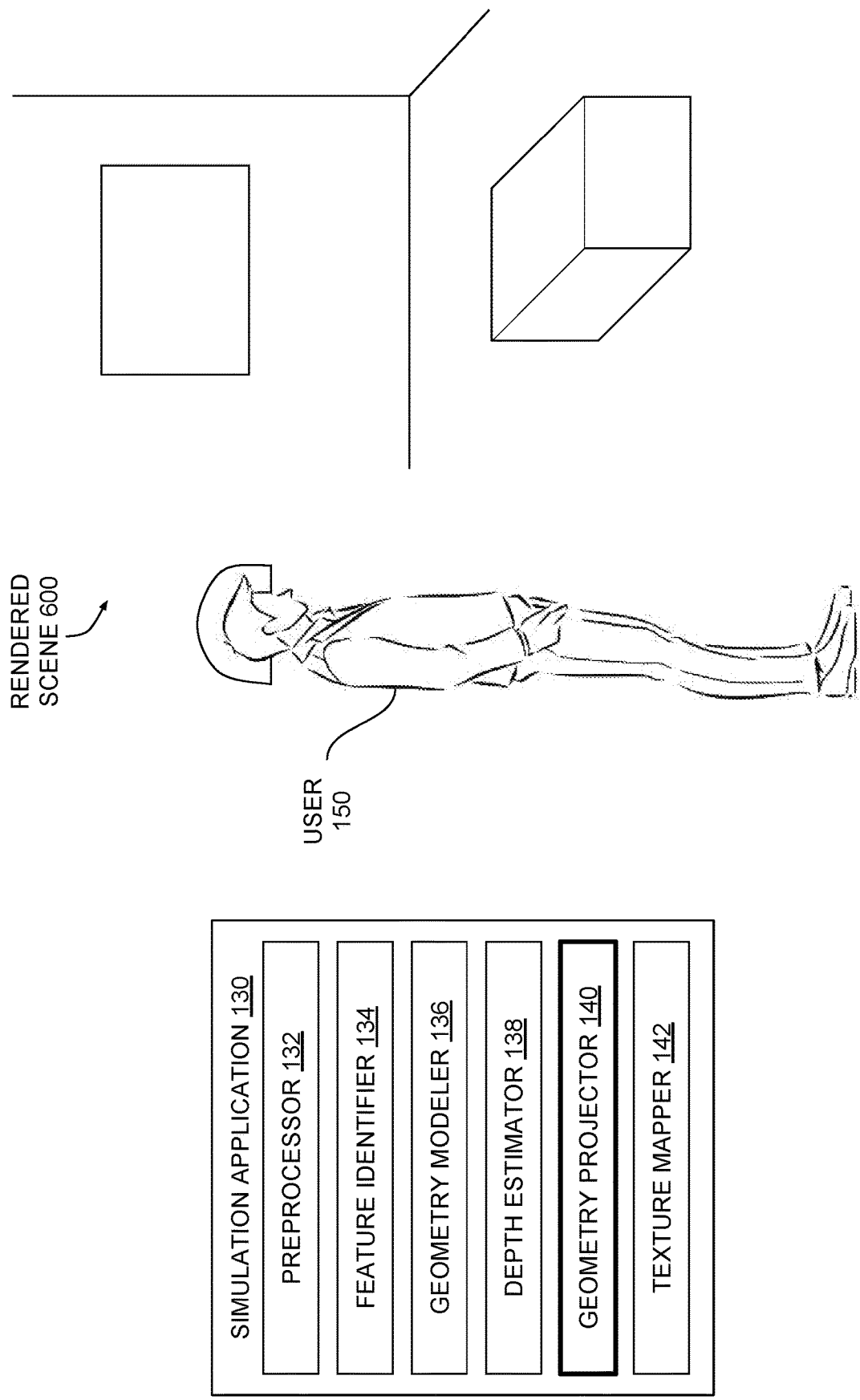
FIG. 6 illustrates how the simulation application of FIG. 1 renders a reconstructed version of a real-world scene, according to various embodiments.

FIG. 6 illustrates how the simulation application of FIG. 1 renders a reconstructed version of a real-world scene, according to various embodiments. As shown, geometry projector 140 within simulation application 130 generates rendered scene 600 for display to user 150 based on geometric reconstruction 500. Geometry projector 140 may generate stereoscopic images representing those 3D graphics based on geometrical features of user 150, including interpupillary distance, among others. Accordingly, rendered scene 600 may appear spatially realistic to user 150 and lack significant spatial distortion. In one embodiment, geometry projector 140 may implement a stylized rendering approach when generating rendered scene 600. For example, geometry projector 140 may render individual lines to appear as hand-sketched lines. This approach may reduce the noticeability of any visual artifacts that may be introduced via the reconstruction process described above.

Rendered scene 600 represents the essential geometry of real-world scene 160 that is needed to permit the localization and orientation of user 150 within the environment. Due to the simplicity of rendered scene 600, that scene can be rendered for display in real time. However, geometric reconstruction 500 underlying that scene need not be updated at an equally high rate. Instead, geometric reconstruction 500 can be updated based on captured stereoscopic imagery as fast as hardware permits, yet still used for real-time rendering purposes based on the position and/or orientation of HMD 110. To further improve realism, textures derived from real-world scene 160 can also be mapped onto geometric reconstruction 500 prior to rendering, as described in greater detail below in conjunction with FIG. 7.

Figure 7:
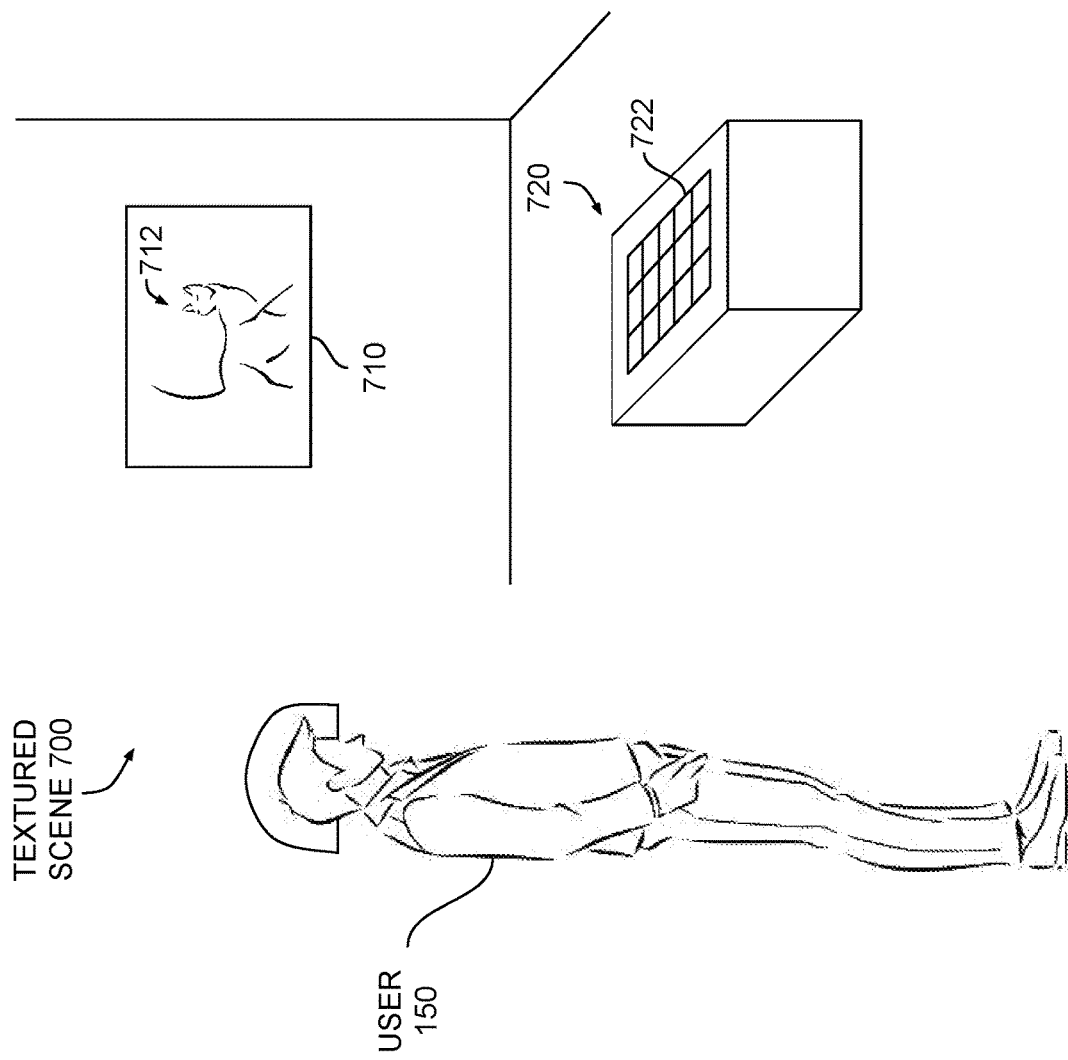
FIG. 7 illustrates how the simulation application of FIG. 1 maps textures from a real-world scene onto a geometric reconstruction, according to various embodiments.

FIG. 7 illustrates how the simulation application of FIG. 1 maps textures from a real-world scene onto a geometric reconstruction, according to various embodiments. As shown, texture mapper 142 within simulation application 130 maps various textures onto geometric reconstruction 500 and then regenerates rendered scene 600 to produce a textured scene 700. Textured scene 700 includes reconstructed frame 710 with painting texture 712 mapped onto that frame, and reconstructed box 720 with placemat texture 722 mapped thereto. Painting texture 712 is derived from raw images of painting 172, while placemat texture 722 is derived from raw images of placement 182.

In one embodiment, texture mapper 142 analyzes raw images captured via HMD 110 to identify textures residing between the 3D polylines generated via geometry modeler 136. Texture mapper 142 then captures stereoscopic clips of these textures and remaps those clips onto the corresponding portion of geometric reconstruction 600. For example, texture mapper 142 could analyze raw images depicting painting 172 and then, based on polylines 410 and/or 3D vertices 502, capture a stereoscopic clip representing painting 172. Subsequently, texture mapper 142 could map that clip onto rendered scene 600 at a location associated with polylines 410. Texture mapper 142 may perform these steps in real-time or as fast as hardware allows. This approach may increase the realism of the mixed reality simulation by adding images to spaces that may otherwise remain blank within geometric reconstruction 500. In another embodiment, geometry projector 140 may implement a technique known in the art as "superpixels" to render large regions of geometric reconstruction 500 with similar color values and with edges aligned to edges within geometric reconstruction 500. In other embodiments, geometric reconstruction 500 can be tessellated uniformly or non-uniformly to fill in otherwise blank areas.

Referring generally to FIGS. 1-7, each of the different processing stages discussed thus far may be performed at a different rate depending on the hardware capabilities of HMD 110 and/or console 120. In some cases, all of these steps can be performed in real-time. In other cases, preprocessor 132, feature identifier 134, geometry modeler 136, and depth estimator 138 operate slower than real time, while geometry projector 140 and texture mapper 142 operate in real time. In any case, simulation application 130 is configured to immersing user 150 into a mixed reality simulation that is spatially realistic and, further, appears to update and render in real time.

Procedure for Generating a Mixed Reality Simulation

Figure 8:
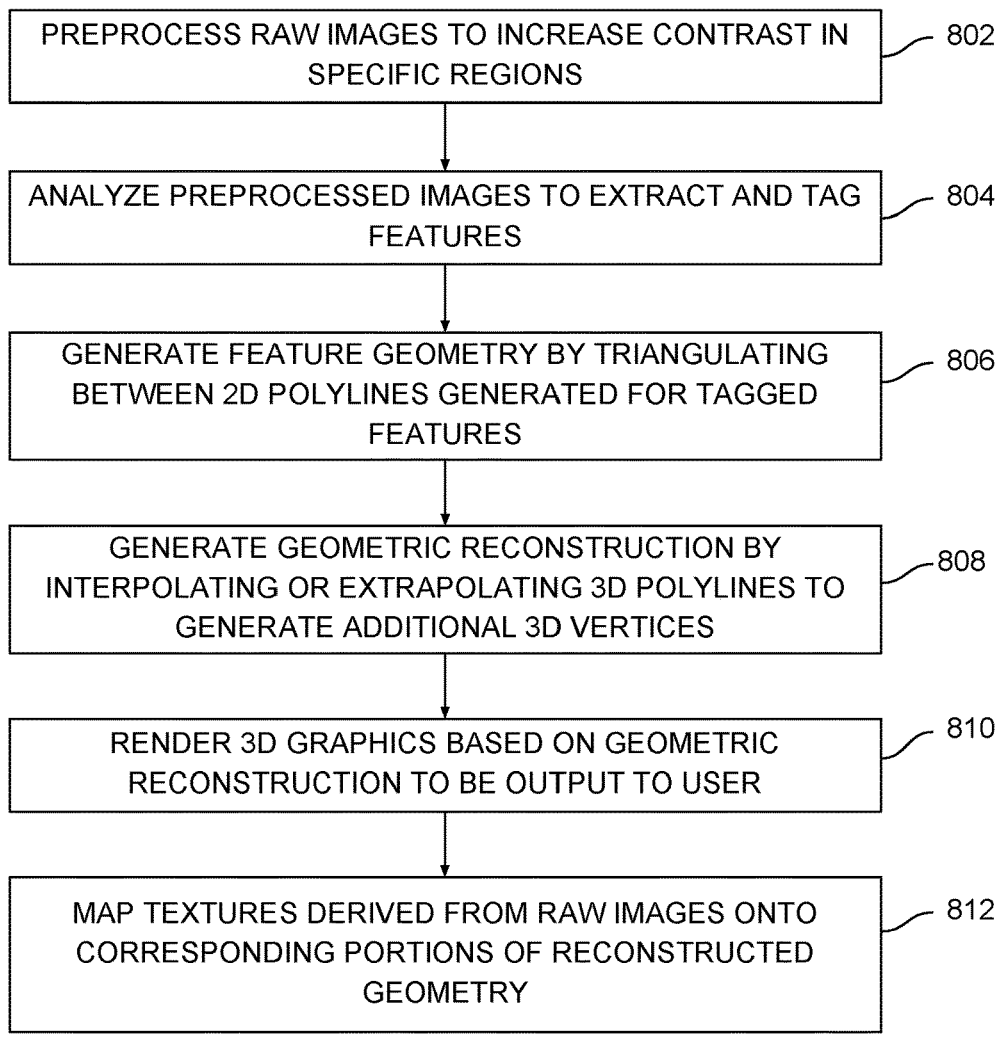
FIG. 8 is a flow diagram of method steps for generating a low-latency simulation of a real-world scene, according to various embodiments.

FIG. 8 is a flow diagram of method steps for generating a low-latency simulation of a real-world scene, according to various embodiments. Although the method steps are described in conjunction with the systems of FIGS. 1-7, persons skilled in the art will understand that any system may be configured to perform the method steps in any order.

As shown, a method 800 begins at step 802, where preprocessor 132 within simulation application 130 preprocesses raw stereoscopic images captured via HMD 110 to increase contrast in specific regions. In one embodiment, preprocessor 132 may adjust image contrast differently across different regions of the raw images. Preprocessor 132 generally increases image contrast in this manner to facilitate subsequent detection of features within preprocessed images, including edges, among other features. An example of how preprocessor 132 preprocessed an image is discussed above in conjunction with FIG. 2.

At step 804, feature identifier 134 within simulation application 130 analyzes preprocessed images to extract and tag features. Feature identifier 134 may implement any technically feasible feature identification technique to identify features within left and right side images captured via HMD 110. Those features may include lines, edges, corners, surfaces, and so forth. In one embodiment, feature identifier 134 implements a Canny edge detection algorithm to identify specific groups of pixels that belong to specific edges. Feature identifier 134 then tags pixels or groups of pixels within preprocessed images with specific feature classifications. An example of how feature identifier 134 identifies features is discussed above in conjunction with FIG. 3.

At step 806, geometry modeler 136 within simulation application 130 generates feature geometry by triangulating between 2D polylines generated for tagged features. In doing so, geometry modeler 136 generates one or more 2D polylines for each feature tagged via step 804. For example, geometry modeler 136 could trace a detected edge and then generate a set of 2D vertices along that edge. Those 2D vertices would form a 2D polyline aligned with the edge. Then, geometry modeler 136 triangulates between matched pairs of the 2D polylines generated at step 806 to estimate depth values for each vertex of those 2D polylines, thereby generating 3D polylines. An example of how geometry modeler 136 generates 3D polylines is discussed above in conjunction with FIG. 4.

At step 808, depth estimator 138 within simulation application 130 generates a geometric reconstruction by interpolating or extrapolating the 3D polylines generated at step 806 to produce additional 3D vertices. Those additional 3D vertices reside in regions of the feature geometry for which little to no geometrical information is available. However, because many spatial environments include numerous planar surfaces, 3D vertices can be generated to represent these regions based on detected features bordering those regions. In one embodiment, depth estimator 138 implements a Delaunay triangulation based on the 3D polylines generated at step 806 in order to generate a triangulated mesh for approximating the additional 3D vertices. An example of how depth estimator 138 generates a geometric reconstruction is discussed above in conjunction with FIG. 5.

At step 810, geometry projector 140 renders 3D graphics based on the geometric reconstruction generated at step 808. Geometry projector 140 may implement any technically feasible approach to rendering graphics based on a 3D model, and may also generate stereoscopic images based on camera angles corresponding to geometrical attributes of user 150. In one embodiment, geometry projector 140 may implement a stylized rendering approach when generating rendered scene 600. For example, geometry projector 140 may render individual lines to appear as hand-sketched lines. This approach may reduce the noticeability of any visual artifacts potentially introduced via the reconstruction process described above. An example of how geometry projector 140 renders graphics is discussed above in conjunction with FIG. 6.

At step 812, texture mapper 142 maps textures derived from raw images captured via HMD 110 onto corresponding portions of the reconstructed geometry. For example, texture mapper 142 could analyze raw images captured prior to step 802, and then clip specific portions of those images corresponding to particular regions of the geometric reconstruction. Subsequently, texture mapper 142 could map the clipped portions onto the geometric reconstruction at appropriate locations. Texture mapper 142 may perform these steps in real-time or as fast as hardware allows. In one embodiment, texture mapper 142 performs step 812 prior to geometry projector 810 rendering the 3D graphics. In another embodiment, the method 800 skips the method 812 altogether. An example of how texture mapper 142 maps textures is discussed above in conjunction with FIG. 7.

Referring generally to FIGS. 1-8, person skilled in the art will understand that any technically feasible form of computer hardware and/or or software may be configured to perform any of the techniques discussed thus far. An exemplary computing device is described in greater detail below in conjunction with FIG. 9.

Example Computing Device

FIG. 9 illustrates a computing device included in the system of FIG. 1, according to various embodiments. As shown, computing device 900 includes a processor 910, input/output (I/O) devices 920, and memory 930. Memory 930 includes a software application 932 and a database 934. Processor 910 may include any hardware configured to process data and execute software applications. I/O devices 920 include devices configured to receive input, devices configured to provide output, and devices configured to both receive input and provide output. Memory 930 may be implemented by any technically feasible storage medium. Software application 932 includes program code that, when executed by processor 910, performs any of the functionality described herein, including that associated with simulation application 130. Software application 932 may access data stored in database 934. Those skilled in the art will understand that computing device 900 is provided for example purposes only and not meant to limit the scope of the present embodiments.

In sum, a mixed reality (MR) simulation system includes a console and a head mounted device (HMD). The MR system captures stereoscopic images from a real-world environment using a set of outward-facing stereoscopic cameras mounted to the HMD. The MR system preprocesses the stereoscopic images to maximize contrast and then extracts a set of features from those images, including edges or corners, among others. For each feature, the MR system generates one or more two-dimensional (2D) polylines. Then, the MR system triangulates between 2D polylines found in right side images and corresponding 2D polylines found in left side images to generate a set of 3D polylines. The MR system interpolates between 3D vertices included in the 3D polylines or extrapolates additional 3D vertices, thereby generating a geometric reconstruction of the real-world environment. The MR system may map textures derived from the real-world environment onto the geometric representation faster than the geometric reconstruction is updated.

At least one advantage of the techniques described herein is that the MR system can produce an immersive and spatially realistic mixed reality experience with little or no latency. Because the MR system generates the geometric reconstruction based only on essential geometric features of the real-world environment, the MR system can update that reconstruction much faster compared to conventional systems that must generate and update highly complex geometric reconstructions. In addition, since the MR system maps textures derived from the real-world environment onto the geometric reconstruction in real time, the MR system can output mixed reality simulations with negligible latency. Accordingly, the techniques disclosed herein represent a significant technological advancement compared to conventional approaches.

1. In some embodiments, a computer-implemented method comprises identifying a set of features associated with one or more objects in a real-world scene, generating two-dimensional (2D) geometry based on the set of features, generating three-dimensional (3D) geometry based on the 2D geometry, the 3D geometry comprising a coarse geometric reconstruction of the real-world scene, and rendering, based on the 3D geometry, a first graphical representation of the real-world scene for display.
2. The computer-implemented method of clause 1, wherein the coarse geometric reconstruction includes one or more visual cues for navigating the real-world scene.
3. The computer-implemented method of clause 1 or 2, wherein the coarse geometric reconstruction comprises a representation of the real-world scene at a first point in time, and further comprising rendering, based on the 3D geometry and at a second point in time later than the first point in time, a second graphical representation of the real-world scene.
4. The computer-implemented method of any of clauses 1-3, wherein the first graphical representation of the real-world scene is displayed via a mixed reality system.
5. The computer-implemented method of any of clauses 1-4, wherein identifying the set of features comprises identifying at least one of an edge, a corner, and a surface within a set of images depicting the real-world scene.
6. The computer-implemented method of any of clauses 1-5, wherein the set of images comprises a stereoscopic pair of images that includes a left camera image and a right camera image.
7. The computer-implemented method of any of clauses 1-6, wherein generating the 2D geometry comprises generating at least one polyline for each feature included in the set of features.
8. The computer-implemented method of any of clauses 1-7, wherein generating the 3D geometry comprises identifying a first polyline included in the 2D geometry, identifying a second polyline included in the 2D geometry, triangulating between the first polyline and the second polyline to generate a plurality of depth values, and generating a 3D polyline based on the first polyline, the second polyline, and the plurality of depth values.
9. The computer-implemented method of any of clauses 1-8, wherein generating the 3D geometry comprises identifying a first polyline included in the 2D geometry, identifying a second polyline included in the 2D geometry, and generating a triangulated mesh based on the first polyline and the second polyline to produce a plurality of 3D vertices for the 3D geometry.
10. The computer-implemented method of any of clauses 1-9, wherein the first polyline is generated based on a first image depicting the real-world scene from a first perspective, and wherein the second polyline is generated based on a second image depicting the real-world scene from a second perspective.
11. The computer-implemented method of any of clauses 1-10, wherein the graphics are rendered for display based further on at least one attribute of a user.
12. The computer-implemented method of any of clauses 1-11, wherein the at least one attribute of the user comprises an interpupillary distance associated with the user.
13. The computer-implemented method of any of clauses 1-12, further comprising increasing a locally-adaptive contrast value associated with a set of images depicting the real-world scene to generate a set of preprocessed images.
14. The computer-implemented method of any of clauses 1-13, wherein the set of features are identified within the set of preprocessed images.
15. The computer-implemented method of any of clauses 1-14, wherein rendering the first graphical representation of the real-world scene comprises extracting a texture from a region within an image depicting the real-world scene, and mapping the texture onto a portion of the coarse geometric reconstruction corresponding to the region.
16. In some embodiments, a non-transitory computer-readable medium storing instructions that, when executed by a processor, cause the processor to perform the steps of identifying a set of features associated with one or more objects in a real-world scene, generating two-dimensional (2D) geometry based on the set of features, generating three-dimensional (3D) geometry based on the 2D geometry, the 3D geometry comprising a coarse geometric reconstruction of the real-world scene, and rendering, based on the 3D geometry, a first graphical representation of the real-world scene for display.
17. The non-transitory computer-readable medium of clause 16, further comprising the steps of updating the 3D geometry with a first latency, and mapping the first texture onto the portion of the 3D geometry with a second latency, the first latency exceeding the second latency.
18. The non-transitory computer-readable medium of clause 16 or 17, wherein the first graphical representation is rendered for display with the second latency.
19. In some embodiments, a system comprises a memory storing program instructions, and a processor that executes the instructions to perform the steps of identifying a set of features associated with one or more objects in a real-world scene, generating two-dimensional (2D) geometry based on the set of features, generating three-dimensional (3D) geometry based on the 2D geometry, the 3D geometry comprising a coarse geometric reconstruction of the real-world scene, and rendering, based on the 3D geometry, a first graphical representation of the real-world scene for display.

20. The system of clause 19, wherein the processor performs the additional steps of updating the 3D geometry with a first latency, and mapping the first texture onto the portion of the 3D geometry with a second latency, the first latency exceeding the second latency.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving a first image of a real-world scene and a second image of the real-world scene, wherein the real-world scene includes one or more objects;
generating a first two-dimensional (2D) geometry corresponding to the first image, the first 2D geometry representing a first 2D view of the real-world scene;
generating a second 2D geometry corresponding to the second image, the second 2D geometry representing a second 2D view of the real-world scene;
generating three-dimensional (3D) geometry based on the first 2D geometry and the second 2D geometry, the 3D geometry comprising a partial representation of the one or more objects of the real-world scene;
generating additional 3D vertices for the 3D geometry based on extrapolating from 3D vertices included in the 3D geometry; and
rendering, based on the 3D geometry, one or more graphical representations of the real-world scene for display.

2. The computer-implemented method of claim 1, further comprising:
identifying, in the first image, a first set of one or more features associated with the one or more objects; and
identifying, in the second image, a second set of one or more features associated with the one or more objects.

3. The computer-implemented method of claim 2, wherein identifying the first set of one or more features comprises identifying at least one of an edge, a corner, or a surface within the first image, and wherein identifying the second set of one or more features comprises identifying at least one of an edge, a corner or a surface within the second image.

4. The computer-implemented method of claim 2, wherein generating the first 2D geometry is based on the first set of one or more features, and wherein generating the second 2D geometry is based on the second set of one or more features.

5. The computer-implemented method of claim 4, wherein generating the first 2D geometry includes generating, for each feature of the first set of one or more features, a corresponding portion of the first 2D geometry, and wherein generating the second 2D geometry includes generating, for each feature of the second set of one or more features, a corresponding portion of the second 2D geometry.

6. The computer-implemented method of claim 1, wherein generating the 3D geometry includes determining a plurality of depth values based on the first 2D geometry and the second 2D geometry.

7. The computer-implemented method of claim 1, wherein generating the 3D geometry includes generating a triangulated mesh based on the first 2D geometry and the second 2D geometry.

8. The computer-implemented method of claim 1, wherein generating the 3D geometry further includes generating a plurality of 3D vertices based on the first 2D geometry and the second 2D geometry.

9. The computer-implemented method of claim 1, wherein rendering the one or more graphical representations includes extracting one or more textures from one of the first image or the second image.

10. The computer-implemented method of claim 1, further comprising:
receiving one or more additional images of the real-world scene;
updating the 3D geometry based on the one or more additional images; and
rendering, based on the updated 3D geometry, one or more second graphical representations of the real-world scene for display.

11. The computer-implemented method of claim 1, further comprising: generating additional 3D vertices for the 3D geometry based on interpolating between a first polyline included in the 3D geometry and a second polyline included in the 3D geometry.

12. A non-transitory computer-readable medium storing instructions that, when executed by one or more processors, cause the one or more processors to perform steps of:
receiving a first image of a real-world scene and a second image of the real-world scene, wherein the real-world scene includes one or more objects;
generating a first two-dimensional (2D) geometry corresponding to the first image, the first 2D geometry representing a first 2D view of the real-world scene;
generating a second 2D geometry corresponding to the second image, the second 2D geometry representing a second 2D view of the real-world scene;
generating three-dimensional (3D) geometry based on the first 2D geometry and the second 2D geometry, the 3D geometry comprising a partial representation of the one or more objects of the real-world scene;
generating additional 3D vertices for the 3D geometry based on extrapolating from 3D vertices included in the 3D geometry; and
rendering, based on the 3D geometry, one or more graphical representations of the real-world scene for display.

13. The non-transitory computer-readable medium of claim 12, wherein the instructions, when executed by the one or more processors, further cause the one or more processors to perform the steps of:
identifying, in the first image, a first set of one or more features associated with the one or more objects; and
identifying, in the second image, a second set of one or more features associated with the one or more objects.

14. The non-transitory computer-readable medium of claim 13, wherein identifying the first set of one or more features comprises identifying at least one of an edge, a corner, or a surface within the first image, and wherein identifying the second set of one or more features comprises identifying at least one of an edge, a corner or a surface within the second image.

15. The non-transitory computer-readable medium of claim 13, wherein generating the first 2D geometry is based on the first set of one or more features, and wherein generating the second 2D geometry is based on the second set of one or more features.

16. The non-transitory computer-readable medium of claim 15, wherein generating the first 2D geometry includes generating, for each feature of the first set of one or more features, a corresponding portion of the first 2D geometry, and wherein generating the second 2D geometry includes generating, for each feature of the second set of one or more features, a corresponding portion of the second 2D geometry.

17. The non-transitory computer-readable medium of claim 13, wherein rendering the one or more graphical representations includes extracting one or more textures from one of the first image or the second image.

18. The non-transitory computer-readable medium of claim 12, wherein generating the 3D geometry includes determining a plurality of depth values based on the first 2D geometry and the second 2D geometry.

19. The non-transitory computer-readable medium of claim 12, wherein generating the 3D geometry includes generating a triangulated mesh based on the first 2D geometry and the second 2D geometry.

20. The non-transitory computer-readable medium of claim 12, wherein generating the 3D geometry further includes generating a plurality of 3D vertices based on the first 2D geometry and the second 2D geometry.

21. A system comprising:
a memory storing program instructions;
one or more processors that executes the program instructions to perform steps of:
receiving a first image of a real-world scene and a second image of the real-world scene, wherein the real-world scene includes one or more objects;
generating a first two-dimensional (2D) geometry corresponding to the first image, the first 2D geometry representing a first 2D view of the real-world scene;
generating a second 2D geometry corresponding to the second image, the second 2D geometry representing a second 2D view of the real-world scene;
generating three-dimensional (3D) geometry based on the first 2D geometry and the second 2D geometry, the 3D geometry comprising a partial representation of the one or more objects of the real-world scene;
generating additional 3D vertices for the 3D geometry based on extrapolating from 3D vertices included in the 3D geometry; and
rendering, based on the 3D geometry, one or more graphical representations of the real-world scene for display.

* * * * *